Aug. 11, 1959   S. NOODLEMAN   2,899,618
INDUCTION MOTOR AND CONTROL
Filed March 25, 1955
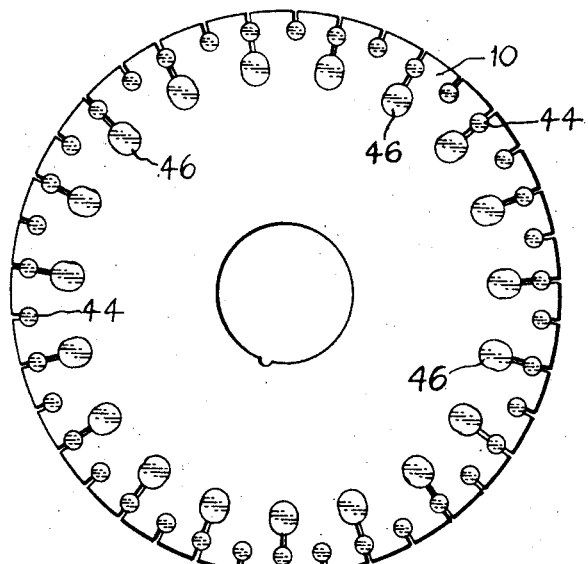
Fig.1
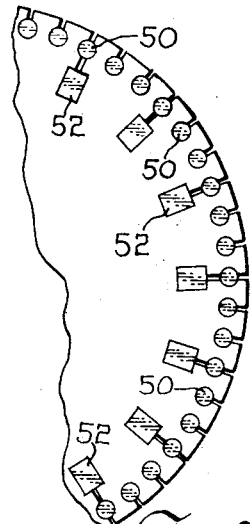
Fig.2
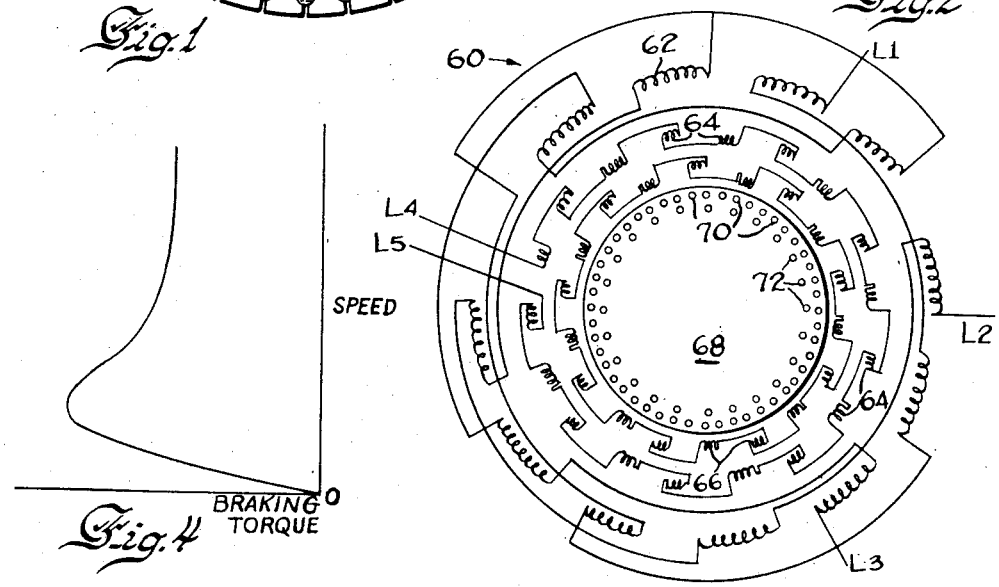
Fig.4
Fig.5
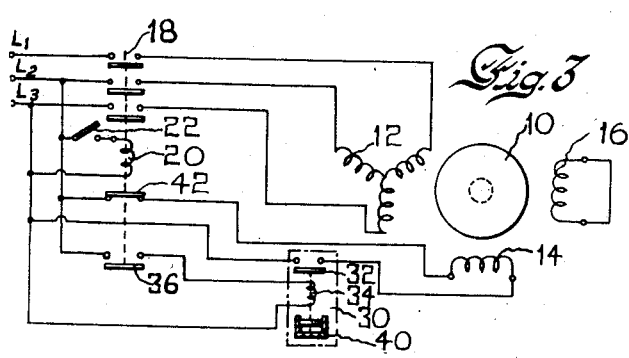
Fig.3
*INVENTOR.*
SAMUEL NOODLEMAN
BY
HIS ATTORNEYS

United States Patent Office 2,899,618
Patented Aug. 11, 1959

2,899,618

INDUCTION MOTOR AND CONTROL

Samuel Noodleman, Dayton, Ohio, assignor, by mesne assignments, to Standard Dayton Corporation, Dayton, Ohio, a corporation of Ohio Application March 25, 1955, Serial No. 496,861

13 Claims. (Cl. 318—211)

The invention relates to an induction motor and control means therefor. The invention relates more particularly to a motor and control in which a braking effect is produced electrically within the motor.

This invention relates to my invention disclosed in Patent No. 2,627,059 and also relates to the invention disclosed in my copending application Serial No. 420,935, filed on or about April 5, 1954. In connection with these inventions it has been learned that an induction motor provided with proper stator windings and provided with a conventional type of rotor is capable of rapid stopping. It has also been learned that if the rotor of such a motor is provided with a unique conductor bar arrangement, the rotor is capable of providing holding torque at zero speed.

In an induction type of motor, by placing a first single-phase winding in the slots of the stator, in addition to the main running winding, and arranging this single-phase winding so as to produce a greater number of poles than produced by the main winding, the deenergization of the main winding followed by the energization of the single-phase winding tends to very rapidly reduce the speed of the motor.

By placing a second single-phase winding 90 degrees out of phase with respect to the first single-phase winding and shorting this second single-phase winding through a conductor, or a condenser, the second single-phase winding increases the braking effect of the first single-phase winding, so that the combined effect of the two windings is to bring the motor to a rapid stop. The second single-phase winding is non-inductively wound with respect to the three-phase winding. Therefore, the second single-phase winding may be permanently shorted by means of a conductor or a condenser. This second single-phase winding is therefore deenergized until the energization of the first single-phase winding occurs.

It has been found, in connection with this invention, that a rotor for such a motor can be produced which provides excellent braking characteristics and also provides excellent load carrying and operating characteristics.

An object of this invention is the provision of a braking motor rotor which is also capable of low slip and high efficiency performance.

Another object of this invention is to provide a motor which is capable of rapid stopping, and which also has excellent operating characteristics.

Another object of the invention is the provision of a rotor for such a motor, which rotor can be produced by conventional casting methods.

Another object of the invention is to provide a rotor for such a high efficiency brake motor which rotor can be sturdily built at reasonably low costs.

Other objects and advantages reside in the construction of parts, the combination thereof and the mode of operation, as will become more apparent from the following description.

In the drawing:

Figure 1 discloses a schematic end view of a typical rotor of a motor and control system of this invention.

Figure 2 is a fragmentary schematic end view showing another rotor made according to this invention.

Figure 3 is a schematic circuit diagram showing a motor and control circuit of this invention.

Figure 4 shows a typical speed-torque curve illustrating the braking effects of a motor made and controlled according to this invention during energization of the braking winding thereof.

Figure 5 is a diagrammatic end view of a rotor and stator of a motor according to this invention.

Referring to the drawing in detail, for purposes of illustration, the motor of this invention is shown of a three-phase, Y-connected, squirrel cage type. It is to be understood that the invention is equally applicable to other types of electric machines, such as single-phase motors, three-phase delta-connected motors; the invention may also be applicable to generators and electric clutches.

Figure 3 shows a typical control circuit. Reference numeral 10 designates a squirrel cage type of rotor arranged to operate in a magnetic field produced by a three-phase stator winding 12.

In addition to the conventional stator winding 12, which may be referred to as the main winding, there is provided a single-phase auxiliary braking winding 14 and a short circuited winding 16. The winding 16, which is shown in Figure 3 as being shorted by means of a conductor, may also be shorted through a condenser or through other suitable electrical means. The winding 12 is arranged to be connected to power supply lines L–1, L–2 and L–3 by means of a conventional three-pole controller 18. The controller 18 is actuated by means of a solenoid 20, which is connected to a starting control switch 22, for operation thereof, in accordance with a well known practice.

The winding 14, in combination with the winding 16, forms a two-phase winding which is adapted to be directly placed in the same stator slots provided for the main stator winding 12. However, the arrangement of windings 14 and 16 is such as to establish a field having a larger number of poles than the number of poles produced by the main stator winding 12.

By virtue of this arrangement of the windings, it is obvious that the synchronous speed of the motor energized solely by the running winding or main stator winding 12 may be several times as great as the synchronous speed of the motor when energized solely through the braking winding 14. The result is that switching from the energization of the main running winding 12 to the energization of the braking winding 14 immediately produces a deceleration in the speed of the rotor 10.

The short circuited winding 16 is arranged within the slots of the stator so as not to have any voltage induced therein by the main running winding 12. The control circuit shown in Figure 3 is so arranged that the braking winding 14 is never energized when the running winding 12 is energized, and vice-versa. However, the instant that the controller 18 is opened, the braking winding 14 is energized for a predetermined period of time.

For purposes of illustration, a timer device 30 is shown for use in controlling a switch 32 which energizes the braking winding 14. The timer device 30 includes a solenoid 34 which is arranged in series with a timer control switch 36, which is an auxiliary switch of the main starting controller 18. The timer control switch 36 is normally open and automatically energizes the solenoid 34 upon the closing of the main controller 18. As illustrated, the timer control switch 36 is operated by the solenoid 20 and is arranged to be closed when the motor is started and remains closed at all times until the main controller 18 is opened. As this occurs, the timer control switch 36 deenergizes the solenoid 34 of the timer 30, which, in turn, deenergizes the switch 32 after a predetermined time delay.

The timer device 30 may be of a conventional type in which the time delay is provided by a dash pot 40 which retards the opening of the switch 32. Naturally, other types of time switches may be employed.

The solenoid 20 also operates a normally closed auxiliary switch 42. The auxiliary switch 42 opens immediately when the solenoid 20 is energized, preventing flow of current through the braking winding 18 when the main running winding 12 is energized. When the braking winding 14 is energized, the short circuited winding 16 becomes energized. The current produced in the short circuited winding 16 opposes the field generated by the flux in the rotor which is established in response to the energization of the braking winding 14. If it were not for the current carried within the short circuited winding 16, the braking winding 14 would tend to keep the rotor 10 operating as a single-phase motor, but at a reduced speed, which speed is dependent upon the number of poles established by the winding 14.

A conventional squirrel cage rotor used in the motor and control circuit above described comes to a complete stop and zero torque is produced by the rotor at zero speed, even though the winding 14 is energized.

It has been found that a rotor having the best braking qualities is one which has a large number of small conductor bars near the periphery of the rotor. However, such a rotor does not give the best operating characteristics under load conditions. Therefore, in connection with this invention, a rotor has been devised which rotor provides excellent braking characteristics and also provides excellent operating characteristics, such as low slip and high efficiencies under load conditions. This rotor has also been so devised that it may be produced by conventional casting methods.

In Figure 1 the rotor 10 is shown as being provided with a plurality of small conductor bars 44 adjacent the periphery thereof. Embedded more deeply within the rotor 10, disposed in annular relation and immediately below alternate conductor bars 44, are a plurality of conductor bars 46. The conductor bars 46 are shown as having a larger cross sectional area than the conductor bars 44. All of the conductor bars 44 and 46 are attached at the ends thereof to a pair of end rings (not shown), there being one end ring at each end of the rotor 10.

The smaller conductor bars 44 aid in rapid deceleration of the motor upon energization of the braking winding 14, and also aid in providing good starting torques. The larger conductor bars 46, which are more deeply embedded within the iron of the rotor 10, aid in providing excellent motor operating characteristics, such as low slip and high efficiency, during energization of the main running winding 12.

It has been found that in order to maintain good braking qualities, the conductor bars 46 must carry a minimum amount of current and be almost ineffective during braking action.

If the number of larger and deeper conductor bars 46 is properly chosen with respect to the number of poles of the braking winding 14, very little, if any, current flows within the conductor bars 46 during energization of the braking winding 14. Therefore, most of the current which flows in the rotor bars during braking action is carried by the smaller and higher resistance conductive bars 44.

It has been found that in order to make the larger rotor bars 46 less effective during braking action, the number of these conductor bars 46 must be selected so that their number does not greatly exceed the number of poles of the braking winding, and preferably the number of conductor bars 46 is less than the number of poles of the braking winding 14.

A large number of small peripheral conductor bars 44 is advantageous for good braking performance. During the braking action, a large number of poles are established in the stator and in the rotor by the braking winding 14, but this number of poles is usually considerably less than the number of small peripheral conductor bars 44. Thus, the number of larger and deeper conductor bars 46 is usually different from the number of small peripheral conductor bars 44.

Figure 1 shows a typical rotor conductor bar arrangement according to this invention for operation with a given stator winding arrangement. Due to the fact that the rotor of this figure shows nineteen larger or deeper conductor bars 46, this rotor might be most effectively braked with a stator having a braking winding 14 arranged to establish approximately sixteen to twenty-four poles.

Rotors provided with sixty-four small conductors adjacent the periphery thereof and thirty-two larger conductors more deeply inset within the rotor have been found to be very satisfactory in cooperation with a twenty-four pole braking winding. Also, rotors provided with forty-eight smaller conductors adjacent the periphery thereof and twenty-four larger conductors more deeply inset within the rotor have been found to be very satisfactory in cooperation with an eighteen-pole brake winding. Other similar arrangements of conductor bars and stator brake windings have also been found very satisfactory.

Figure 2 discloses a rotor conductor bar arrangement in which there are three times as many peripheral conductor bars 50 as there are deeper conductor bars 52. For best braking action, this conductor bar arrangement, like other conductor bar arrangements made according to this invention, is best used with a stator brake winding having a number of poles not greatly exceeding, and preferably less than, the number of deeper conductor bars 52.

Thus, a rotor is provided for a brake motor of this invention, which rotor provides excellent braking characteristics.

Figure 4 shows a speed-torque curve of a motor and control arrangement, of the type shown in Figure 3, during energization of the braking winding 14.

The induction motor of this invention is also capable of low slip, high efficiency performance.

In Figure 5 is shown diagrammatically a typical motor 60 of this invention provided with a main stator winding 62, similar to winding 12 shown in Figure 3. The stator of the motor 60 is also provided with a braking winding 64 similar to the winding 14 of Figure 3. The stator of the motor 60 also has a short circuited winding 66 which is similar to the winding 16 of Figure 3.

The winding 62 may be connected to any suitable source of electrical energy by means of lines L1, L2 and L3. The braking winding 64 may be connected to any suitable source of electrical energy by means of lines L4 and L5. The motor 60 is provided with a rotor 68 which has a plurality of outer conductor bars 70 and a plurality of more deeply disposed conductor bars 72. It is to be noted that the number of more deeply disposed conductor bars 72 is 24. The number of poles of the braking winding 64 is 18. It has been found that satisfactory running and braking operation is obtainable with a motor having such an arrangement of poles of the braking winding and more deeply positioned conductor bars 72. However, it is to be understood that, as stated above, any arrangement in which the number of more deeply positioned conductor bars is approximately equal to the number of poles of the braking winding provides satisfactory braking and running operation.

Rotors made according to this invention may be produced in accordance with well known methods of rotor manufacture, such as by casting or fabricating. Hence, the cost of production of such rotors may be approximately the same as the cost of producing conventional rotors.

In connection with the invention set forth in the aforesaid patent application, Serial No. 420,935, a rotor of this invention may also be provided with conductor bars, some of which are of a given material and others of which are of a different material to provide locking action at zero speed in addition to rapid deceleration.

As stated above, the number of deeper conductor bars is so chosen with respect to the number of poles established by the braking winding that there is negligible current flow in the deeper conductor bars during energization of the braking winding. Due to this fact, in order to produce a rotor having locking characteristics to retain the rotor at zero speed, it is necessary to arrange only the outer or peripheral conductor bars so that some of the bars have resistance values different from the resistances of other conductor bars, as disclosed in said patent application Serial No. 420,935.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an induction motor, a stator, a rotor, a main stator winding arranged to establish a given number of poles, an auxiliary stator winding arranged to establish a different number of poles for braking operation, a short circuited stator winding displaced 90 degrees electrically with respect to the auxiliary stator winding, the short circuited stator winding being non-inductively wound with respect to the main stator winding, means for separate energization of the main stator winding, means for separate energization of the auxiliary stator winding, a first group of rotor conductor bars within the rotor and spaced from the periphery thereof, the number of the first group of rotor conductor bars being approximately equal to the number of poles established by the auxiliary stator winding, a second group of rotor conductor bars, the second group of rotor conductor bars being disposed in annular arrangement adjacent the periphery of the rotor and greater in number than the first group of rotor conductor bars, both groups of rotor conductor bars thus carrying rotor current during running operation of the motor and the second group of rotor conductor bars carrying most of the rotor current during braking operation.

2. In an induction motor, a stator, a rotor, the stator being provided with a main winding arranged to establish a given number of poles, the stator also having a brake winding arranged to establish a different number of poles, means for separate energization of the main winding and the brake winding, a first group of annularly arranged rotor conductor bars, the first group of rotor conductor bars being disposed adjacent the periphery of the rotor, a second group of annularly arranged rotor conductor bars, the second group of rotor conductor bars being more deeply positioned within the rotor than the first group of rotor conductor bars, the second group of rotor conductor bars being approximately equal in number to the number of poles of the brake winding.

3. In an electric motor, a first field winding having a given number of poles, a second field winding, the second field winding having a greater number of poles than the first field winding, a rotor, a first rotor winding, the first rotor winding having conductor members adjacent the periphery of the rotor, a second rotor winding, the second rotor winding having conductor members fewer in number than the conductor members of the first rotor winding and more deeply positioned from the periphery of the rotor than the conductor members of the first rotor winding, the number of conductor members more deeply positioned within the rotor being approximately equal in number to the number of poles of the second field winding.

4. In an alternating current motor, a stator, a squirrel cage rotor, said stator having a three-phase winding for energizing the motor, a brake winding within the stator having a different number of poles from the number of poles of the three-phase winding, a plurality of conductor bars within the rotor and adjacent the periphery thereof, a plurality of conductor bars more deeply positioned within the rotor than the first said conductor bars, the conductor bars which are more deeply positioned within the rotor being fewer in number than the conductor bars which are adjacent the periphery of the rotor, the more deeply positioned conductor bars being approximately equal in number to the number of poles of the brake winding.

5. In an alternating current motor, a stator, a squirrel cage rotor, a running winding within the stator, the running winding having a given number of poles, a brake winding within the stator, the brake winding having a greater number of poles than the running winding, a plurality of conductor members extending through the rotor, some of said conductor members being more deeply positioned within the rotor than the other conductor members, the more deeply positioned conductor members being approximately equal in number to the poles of the brake winding.

6. In an electric motor, a stator, a rotor, a main stator winding arranged to establish a given number of poles, a braking winding arranged to establish a different number of poles, a short circuited stator winding displaced 90 degrees electrically with respect to the braking winding, the short circuited stator winding being non-inductively wound with respect to the main stator winding, means for separate energization of the main stator winding, means for separate energization of the braking winding, a first group of rotor conductor bars within the rotor and spaced from the periphery thereof, a second group of rotor conductor bars, the second group of rotor conductor bars being disposed adjacent the periphery of the rotor and being greater in number than the first group of rotor conductor bars, the number of the first group of rotor conductor bars being so selected with respect to the number of poles established by the braking winding that a minimum amount of current flows in the first group of rotor conductor bars during energization of the braking winding, both groups of rotor conductor bars thus carrying rotor current during running operation of the motor and the second group of rotor conductor bars carrying most of the rotor current during braking operation.

7. A squirrel cage type of rotor for an induction motor of the type provided with a stator having a main stator winding arranged to established a given number of poles, the stator also having a two-phase braking winding arranged to establish a different number of poles, one phase of said two-phase braking winding being short circuited, the short circuited phase of the braking winding being non-inductively wound with respect to the main stator winding, the stator also having means for separate connection to the main stator winding and means for separate connection to the braking winding, the combination comprising a first group of rotor conductor bars within the rotor, the first group of rotor conductor bars being spaced from the periphery thereof, the number of the first group of rotor conductor bars being so selected with relation to the number of poles established by the braking winding that during energization of the braking winding a small amount of current flows within the first group of rotor conductor bars, a second group of rotor conductor bars, the second group of rotor conductor bars being disposed adjacent the periphery of the rotor and being different in number from the number of the first group of rotor conductor bars, the number of the first group of rotor conductor bars being greater in number than the number of poles established by the braking winding.

8. In an alternating current motor, a stator, a rotor, the stator being provided with a main running winding, the main running winding having a given number of poles, the stator also being provided with a brake winding, the brake winding having a greater number of poles than the main running winding, a plurality of conductor members extending in an axial direction through the rotor, some of the conductor members being more deeply positioned within the rotor than the other conductor members, the more deeply positioned conductor members being slightly greater in number than the number of poles of the brake winding.

9. In an electric motor, a stator, a rotor, a main stator winding arranged to establish a given number of poles, a braking winding arranged in the stator to establish a different number of poles, a first group of rotor conductor bars within the rotor, a second group of rotor conductor bars within the rotor, the second group of rotor conductor bars being more deeply positioned within the rotor than the first group of conductor bars, the number of the second group of rotor conductor bars being approximately equal to the number of poles of the braking winding so that a minimum amount of current flows in the first group of rotor conductor bars during energization of the braking winding, both groups of rotor conductor bars thus carrying rotor current during running operation of the motor and the second group of rotor conductor bars carrying most of the rotor current during braking operation.

10. In an electric device, an outer magnetizable member, an inner magnetizable member within the outer magnetizable member, the magnetizable members being relatively rotatable, one of the magnetizable members being provided with a plurality of windings including a main winding and a two-phase winding, the main winding being arranged to establish a given number of poles, the two-phase winding being arranged to establish a greater number of poles, means for connecting the main winding to a source of electrical energy, means joining the ends of one phase of the two-phase winding, means for connecting the other phase of the two-phase winding to a source of electrical energy, a first group of conductor members within the other of said magnetizable members, the first group of conductor members being disposed in annular arrangement and adjacent a surface of said magnetizable member, a second group of conductor members within said other magnetizable member and disposed in annular arrangement and farther from said surface of said magnetizable member than the first group of conductor members, the number in the second group of conductor members being approximately equal to the number of poles established by said two-phase winding.

11. In an electric device, an outer magnetizable member, an inner magnetizable member within the outer magnetizable member, the magnetizable members being rotatable one with respect to the other, a plurality of windings in one of said magnetizable members including a main winding and a two-phase winding, said main winding being arranged to establish a given number of poles, said two-phase winding being arranged to establish a greater number of poles, one phase of the two-phase winding being closed on itself, a first group of conductor members within the other of said magnetizable members, the first group of conductor members being disposed in annular arrangement and extending axially adjacent a surface of said magnetizable member, a second group of conductor members within said magnetizable member extending in an axial direction and disposed in annular arrangement and farther from said surface of said magnetizable member than the first group of conductor members, the number of conductor members in the second group of conductor members being greater than the number of poles established by said two-phase winding.

12. In an electric device, an outer magnetizable member, an inner magnetizable member, the inner magnetizable member being disposed within the outer magnetizable member and concentric therewith, the magnetizable members being relatively rotatable, one of said magnetizable members being provided with a plurality of windings including a main winding and a braking winding, said main winding being arranged to establish a given number of poles, said braking winding being arranged to establish a greater number of poles, a first group of conductor members within the other of said magnetizable members, the first group of conductor members being disposed in annular arrangement and adjacent a surface of said magnetizable member, a second group of conductor members within said magnetizable member disposed in annular arrangement and farther from said surface of said magnetizable member than the first group of conductor members, the number of conductor members in the second group of conductor members being approximately equal to the number of poles established by said braking winding, energization of the main winding causing relative rotation between the magnetizable members, energization of the auxiliary winding causing a braking action so that relative rotation between the magnetizable members ceases.

13. In an electric device, an outer magnetizable member, an inner magnetizable member, the inner magnetizable member being disposed within the outer magnetizable member and concentric therewith, the magnetizable members being rotatable one with respect to the other, one of said magnetizable members being provided with a plurality of windings including a main winding and a braking winding, said main winding being arranged to establish a given number of poles, said braking winding being arranged to establish a greater number of poles, a first group of conductor members within the other of said magnetizable members, the first group of conductor members being disposed in annular arrangement and extending axially adjacent a surface of said magnetizable member, a second group of conductor members within said magnetizable member extending in an axial direction and disposed in annular arrangement and farther from said surface of said magnetizable member than the first group of conductor members, the number of the second group of conductor members being greater than the number of poles established by said braking winding, energization of the main winding causing relative rotation between the magnetizable members, energization of the braking winding causing a braking action and causing stopping of the relative rotation between the magnetizable members.

References Cited in the file of this patent

UNITED STATES PATENTS

| | | |
|---|---|---|
| 1,290,945 | Emmet | June 14, 1919 |
| 1,650,795 | Johnson | Nov. 29, 1927 |
| 2,292,168 | Smith | Aug. 4, 1942 |
| 2,627,059 | Noodleman | Jan. 27, 1953 |

FOREIGN PATENTS

| | | |
|---|---|---|
| 179,890 | Great Britain | Feb. 7, 1923 |
| 359,207 | Great Britain | Oct. 22, 1932 |